A. M. LEVERING.
TROLLEY WHEEL.
APPLICATION FILED OCT. 1, 1908.
935,852.
Patented Oct. 5, 1909.
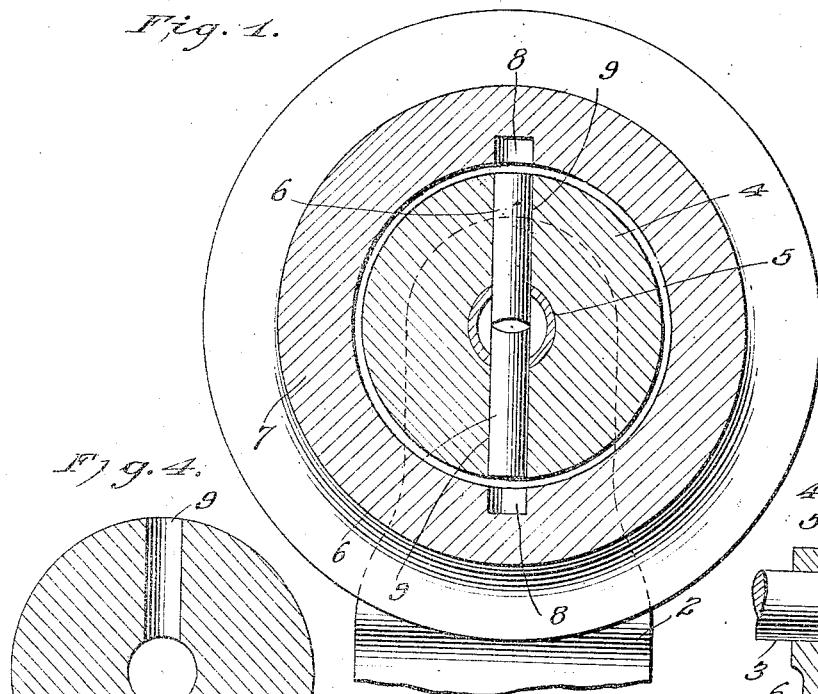
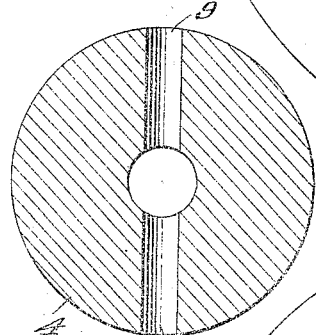
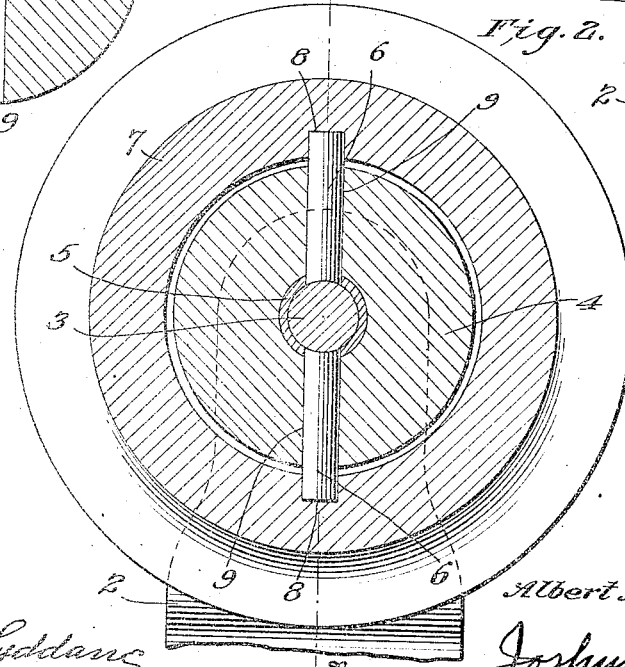
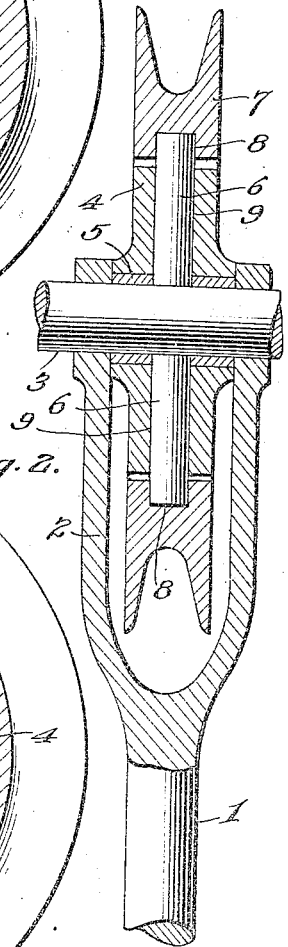
Inventor
Albert M. Levering

UNITED STATES PATENT OFFICE.

ALBERT M. LEVERING, OF PHILADELPHIA, PENNSYLVANIA.

TROLLEY-WHEEL.

935,852.

Specification of Letters Patent.

Patented Oct. 5, 1909.

Application filed October 1, 1908. Serial No. 455,676.

*To all whom it may concern:*

Be it known that I, ALBERT M. LEVERING, a citizen of the United States, residing at Philadelphia, in the county of Philadelphia and State of Pennsylvania, have invented certain new and useful Improvements in Trolley-Wheels, of which the following is a specification.

My invention relates to improvements in trolley wheels, an object of the invention being to so construct the wheel, that its engaging rim will be permitted a certain pivotal movement with relation to the body of the wheel, which will enable the wheel to follow various bends and curves of a wire without disengagement.

A further object is to provide a trolley wheel of this character, comprising but few inexpensive parts, which can be easily and cheaply assembled, and be substantial and durable in use.

With these and other objects in view, the invention consists in certain novel features of construction, combinations and arrangements of parts as will be more fully hereinafter described and pointed out in the claims.

In the accompanying drawings Figure 1, is a view in vertical longitudinal section illustrating my improvements with the several parts in position for assembling. Fig. 2, is a similar view showing the parts assembled and in operative position. Fig. 3, is a view in cross section on line x—x of Fig. 2, and Fig. 4, is a view in longitudinal section of the central disk or body portion of the wheel.

1 represents an ordinary trolley pole having the usual forked end 2 carrying the journal 3 upon which my improved trolley wheel is mounted. The wheel comprises a central disk 4 having a transverse central bore in which the bearing sleeve or bushing 5 is mounted to turn upon the journal 3, this central disk 4 and its bushing 5 are made with longitudinal alined openings 9 to receive pins 6. The pins 6 are of slightly greater length than the length of the openings in the disk and sleeve or bushing and are preferably concaved at their inner ends for a purpose which will more fully hereinafter appear. A rim 7 is provided around the disk 4 and loosely fits the same, and is made with opposite internal recesses or sockets 8, to receive the outer ends of pins 6, when the latter are moved outward, in assembling the wheel, as will now be described.

The disk 4 with the pins 6 are forced inward so as not to project beyond the periphery of the disk is inserted within the rim 7, and a suitable instrument is passed into the bearing sleeve 5 and forces the pins 6 outward, into the recesses 8 in the rim, and while in this position the journal 3 is inserted, and will, during the operation of the wheel, hold the pins in their projected positions without additional means. The inner ends of the pins, as above stated, are concaved or rounded not only for the purpose of providing a smooth bearing against the journal 3, but also to provide an opening between the pins when they are forced inward to their innermost positions, and enabling the entrance of a tool between them to force them outward and receive the journal.

This construction of wheel enables the rim to have a certain pivotal movement with relation to the central disk or body portion, and is in effect a gimbal joint. For instance when the pins 6 are in a substantial vertical position the wheel rim can rock in a horizontal plane and when the pins are horizontal, or substantially so, the wheel will rock in a vertical plane, thus allowing the wheel to track along the wire and follow the bends and curves without danger of jumping off.

The parts of the wheel are inexpensively made, readily assembled, are not liable to become damaged in use and will prevent a great deal of damage and annoyance caused by the wheels leaving the wire as is common in every day operation of trolley cars and the like.

While I have shown and described a form of my invention which I believe to be the best form, I would have it understood that I do not restrict myself to the particular structure shown and described, but consider myself at liberty to make such slight changes and illustrations as fairly fall within the spirit and scope of my invention.

Having thus described my invention what I claim as new and desire to secure by Letters Patent is:

1. A trolley wheel comprising a central disk, a rim thereon, and means pivotally connecting the disk and rim.

2. A trolley wheel comprising a central disk, a rim thereon, and alined pivot pins projecting into the disk and rim and pivotally connecting the rim with the disk.

3. A trolley wheel comprising a central disk, a rim thereon, and alined pins in the disk projecting into the rim and pivotally connecting the rim and disk.

4. A trolley wheel comprising a central disk having alined longitudinal openings therein, pins in said openings of greater length than said openings, and a rim on said disk having recesses to receive the pins.

5. A trolley wheel comprising a central disk having a transverse bore, a bearing sleeve therein, said disk and sleeve having alined openings, pins in said openings, and a rim on said disk having recesses therein to receive the pins and permit pivotal movement of the rim on the disk.

6. A trolley wheel comprising a central disk having alined openings therein, a rim on said disk having recesses alined with the openings in the disk, pins in said openings in the disk, and a journal in said disk projecting the pins into the recesses in the rim.

In testimony whereof I have signed my name to this specification in the presence of two subscribing witnesses.

ALBERT M. LEVERING.

Witnesses:
R. H. KRENKEL,
J. A. E. MULHALL.